(12) United States Patent
Stimm et al.

(10) Patent No.: US 10,147,980 B2
(45) Date of Patent: Dec. 4, 2018

(54) METHOD FOR BATTERY MANAGEMENT AND BATTERY MANAGEMENT SYSTEM

(71) Applicant: Robert Bosch GmbH, Stuttgart (DE)

(72) Inventors: Frank Stimm, Leonberg (DE);
Andreas Lemke, Stuttgart (DE);
Benjamin Mangold, Stuttgart (DE);
Christian Korn, Stuttgart (DE);
Thomas Dufaux, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/313,648

(22) PCT Filed: Apr. 27, 2015

(86) PCT No.: PCT/EP2015/059085
§ 371 (c)(1),
(2) Date: Nov. 23, 2016

(87) PCT Pub. No.: WO2015/180910
PCT Pub. Date: Dec. 3, 2015

(65) Prior Publication Data
US 2017/0207498 A1    Jul. 20, 2017

(30) Foreign Application Priority Data
May 28, 2014   (DE) .......................... 10 2014 210 197

(51) Int. Cl.
*H01M 10/44*    (2006.01)
*H02J 7/00*    (2006.01)
(Continued)

(52) U.S. Cl.
CPC ....... *H01M 10/441* (2013.01); *B60L 11/1851* (2013.01); *B60L 11/1857* (2013.01);
(Continued)

(58) Field of Classification Search
CPC ........................... H01M 10/411; H02J 7/0063
See application file for complete search history.

(56) References Cited

U.S. PATENT DOCUMENTS 3,252,381 A    5/1966  Louis
6,402,810 B1   6/2002  Mayer et al.
(Continued)

FOREIGN PATENT DOCUMENTS

DE            4201565        7/1993
DE         102011002967      7/2012
(Continued)

OTHER PUBLICATIONS

International Search Report for Application No. PCT/EP2015/059085 dated Jul. 16, 2015 (English Translation, 2 pages).

*Primary Examiner* — Daniel Kessie
*Assistant Examiner* — Terrence Willoughby
(74) *Attorney, Agent, or Firm* — Michael Best & Friedrich LLP

(57) ABSTRACT

The invention relates to a method for managing a battery comprising a plurality of battery cells, wherein a maximum value of a current that can be delivered by the battery is adjusted on the basis of a frequency distribution (44) of a root mean square current delivered by the battery. The invention further relates to a battery management system and a computer program for carrying out said method as well as to a motor vehicle comprising a battery which includes a battery management system of said type.

10 Claims, 2 Drawing Sheets

(51) Int. Cl.
*H01M 10/42* (2006.01)
*B60L 11/18* (2006.01)
*H01M 2/10* (2006.01)
*B60L 15/02* (2006.01)
*H01M 10/0525* (2010.01)
*H01M 10/052* (2010.01)

(52) U.S. Cl.
CPC ......... *B60L 11/1861* (2013.01); *B60L 15/02* (2013.01); *H01M 2/1077* (2013.01); *H01M 10/0525* (2013.01); *H01M 10/425* (2013.01); *H02J 7/0063* (2013.01); *B60L 2240/549* (2013.01); *B60L 2260/162* (2013.01); *H01M 10/052* (2013.01); *H01M 2010/4271* (2013.01); *H01M 2220/20* (2013.01); *H02J 2007/0067* (2013.01); *Y02E 60/122* (2013.01); *Y02T 10/645* (2013.01); *Y02T 10/705* (2013.01); *Y02T 10/7005* (2013.01); *Y02T 10/7044* (2013.01)

(56) References Cited

U.S. PATENT DOCUMENTS

| 2005/0083017 | A1* | 4/2005 | Suzuki | B60K 6/445 |
| | | | | 320/128 |
| 2012/0091971 | A1* | 4/2012 | Syed | B60L 11/1851 |
| | | | | 320/162 |
| 2013/0271148 | A1 | 10/2013 | Maeda | |
| 2013/0278221 | A1 | 10/2013 | Maeda | |

FOREIGN PATENT DOCUMENTS

| DE | 102011012818 A1 | 9/2012 |
| EP | 1526627 | 4/2005 |
| GB | 2286299 | 8/1995 |
| JP | H09120843 A | 5/1997 |
| JP | 2013051115 A | 3/2013 |
| WO | 0243980 | 6/2002 |
| WO | 2007048367 | 5/2007 |
| WO | 2012091077 | 7/2012 |

* cited by examiner

METHOD FOR BATTERY MANAGEMENT AND BATTERY MANAGEMENT SYSTEM

BACKGROUND OF THE INVENTION

The invention relates to a method for managing a battery. The invention also relates to a computer program and a battery management system, which are equipped to carry out the method as well as to a motor vehicle comprising a battery and a battery management system of said type.

In electrically driven vehicles, storage batteries based on lithium chemistry are often used as electrical energy stores (EES) because said batteries have the largest energy density available up until now in comparison to nickel or lead based storage batteries. Very high demands are placed on battery systems that are used in electrically driven vehicles with regard to available energy content, discharge power, charging/discharging efficiency, service life and reliability. A service life of 15 years is expected from these storage batteries.

A trouble-free operation of such battery systems requires the safe and reliable function of the cells, modules and the entire battery pack. In order to achieve this, physical variables such as amperages, voltages, temperatures, insulation resistances and pressures are continually controlled. With the aid of the measured values of these variables, management and operating functions can be implemented with which the warranted durability, reliability and safety of the battery system can be maintained. In order to prevent premature ageing of the battery cells, cell voltage limit values and maximum amperages are predefined.

A root mean square current represents a parameter that is very decisive for ageing. This parameter, i.e., more precisely stated, the root thereof, is also denoted as the $I_{RMS}$-value. In the case of the root mean square current, high amperages are more strongly weighted than low amperages. The $I_{RMS}$-value therefore takes into account the development of the temperature gradient within the cell as well as the effects of the deposit of the lithium on the electrodes, so-called lithium plating. The root mean square current is also written as:

$$(I_{RMS})^2 = \frac{1}{t2} \int_{1}^{t+t2} I^2(t)dt$$

Limit values exist for this parameter to which said parameter is adjusted in the prior art. It is, for example, known from the German patent application DE 10 2011 012 818 A1 how to determine the root mean square current and keep the same below a predefined setpoint value, i.e.

$$(I_{RMS})^2 < (I_{RMS\_lim})^2$$

The WIPO patent application WO 2012/091077 discloses a method in which a state of health (SOH) is ascertained from the root mean square current.

Because the limit value for the root mean square current reaches the limit thereof within a short period of time at low temperatures or when starting to ascend a hill, for example already after 10 seconds, an aim of the invention is increase the limit values without having to modify the warranted battery service life, which, for example, is set at 15 years.

SUMMARY OF THE INVENTION

Provision is made in a method according to the invention for the battery management of a battery comprising a plurality of battery cells for a maximum value of a current that can be delivered by the battery to be adjusted on the basis of a frequency distribution of a root mean square current delivered by the battery.

The invention enables the specification of the cell ageing by evaluating an historical memory of the root mean square current to be maintained. This is possible by adjusting the maximum value of the current that can be delivered by the battery. The maximum value of the current that can be delivered by the battery is, for example, communicated to the battery management system so that an inverter is accordingly adjusted and only calls up this amount of the current.

Damage to the storage battery on account of too high of a power output is prevented by the method according to the invention and a given service life warranty is better fulfilled. This not only prevents damage by maximum currents to the battery but ensures that the battery operates in the desired range and thus does not have to be replaced prematurely.

In an advantageous manner, a higher maximum value can nevertheless be allowed, for example, for a small portion of the total operating time of the battery. For example, more power can be temporarily made available to the driver and only then be adjusted if the driver would drive very progressively over the entire operating period. In so doing, the invention represents a significant improvement with respect to the current prior art.

The method is particularly suitable for use with batteries that are used in electric vehicles or hybrid vehicles. The demands on these batteries include, for example, that they deliver between 50 volts and 600 volts of voltage. Examples of suitable battery types include all types of lithium-ion batteries. When using the method, the development of a harmful temperature gradient in the battery is prevented on the one hand and, on the other hand, the deposit of lithium on the electrodes is prevented.

According to a preferred embodiment of the invention, the control takes place only within a warranted operating time, i.e. until a warranted operating time has elapsed. In a mathematical formulation of the control, this restriction is implemented when calculating the maximum value of the current that can be delivered by the battery by introducing a weighting factor, which is set at zero in the event that the current point in time $t_{akt}$ is greater than the warranted operating time $t_{gw}$, i.e.

w=0, in the event that $t_{akt} > t_{gw}$

In a particularly preferred manner, the closer the warranted operating time $t_{gw}$ gets to the end, the weaker the control during the warranted operating time as a function of a ratio of the current operating time $t_{akt}$ to the warranted operating time $t_{gw}$ takes place. In the mathematical formulation of the control function, this is taken into account by the weighting factor in accordance with the equation:

$$w = 1 - \frac{takt}{tgw}$$

wherein the following particularly applies:

$$w = 1 - \frac{takt}{tgw} \text{ and } w = 0, \text{ in the event } t_{akt} > t_{gw}$$

Data is preferably ascertained from the frequency distribution of the root mean square current delivered by the battery about a proportion in a low current intensity range, a first proportion in a first high current intensity range and a second proportion in a second high current intensity range, wherein the first high current intensity range is set lower than the second high current intensity range. The first high current intensity range preferably directly adjoins the second high current intensity range. The low current intensity range likewise preferably directly adjoins the first high current intensity range. The control of the maximum value of the current that can be delivered by the battery therefore takes place on the basis of a frequency distribution, from which the relative proportions of at least three current intensity ranges that are separated from one another are ascertained.

The control thereby occurs as a function of setpoint values for the proportions in the high current intensity ranges, in particular for the proportions in the first and second high current intensity range.

A first setpoint value for the first high current intensity range preferably lies between 10% and 50%, in particular between 20% and 40% and particularly preferably at approximately 35% of the total operating period. A second setpoint value for the second high current intensity range preferably lies between 1% and 10%, in particular between 2% and 5%, particularly preferably at approximately 3% of the total operating period. In this embodiment, there is no restriction for the lower current intensity range, i.e. the battery can deliver a root mean square current for up to 100% of the total operating period.

The first high current intensity range lies, for example, between 60 A and 100 A. The second high current intensity range lies for example between 100 A and 130 A. The low current intensity range lies, for example, below 60 A. The boundaries for delimiting the current intensity ranges 60 A, 100 A and 130 A are in fact preferred values, can however in practice also be defined otherwise. In practice, this is defined by means of corresponding test series.

According to the invention, a computer program is furthermore provided, according to which one of the methods described here is carried out if the computer program is executed on a programmable computer device. The computer program can relate, for example, to a module for implementing a battery management system or a subsystem thereof in a motor vehicle. The computer program can be stored on a machine-readable storage medium, for example on a permanent or rewritable storage medium or in association with a computer device or on a removable CD-ROM, DVD, a Blu-ray disc or a USB drive. Additionally or alternatively, the computer program can be provided on a computer device, such as on a server or on a cloud system, for downloading, e.g. via a data network, such as the internet or a communication connection, such as a telephone line or a wireless connection.

According to the invention, a battery management system of a battery comprising a plurality of battery cells is provided, which has a unit for determining a root mean square current delivered by the battery, a unit for evaluating a frequency distribution of the root mean square current delivered by the battery and a unit for adjusting a maximum value of a current that can be delivered by the battery on the basis of the results of the unit for evaluating the frequency distribution.

The battery management system is preferably designed and/or equipped for carrying out the method described here. Features described within the scope of the method correspondingly apply to the battery management system and conversely the features described within the battery management system correspondingly apply to the method.

The units of the battery management system are to be understood as functional units, which are not necessarily physically separated from one another. A plurality of units of the battery management system can thus be implemented in a single physical unit, for example if a plurality of functions are implemented in software in a control device. The units of the battery management system can also be implemented in hardware components, for example by means of sensor units, storage units and application specific integrated circuits (ASIC, application specific circuit).

According to the invention, a battery system including a battery, which comprises a plurality of battery cells, and such a battery management system is provided. The battery can particularly be a lithium-ion battery or a nickel-metal hydride battery and be connectable to a drive system of a motor vehicle.

In the present description, the terms "battery" and "battery unit" are adapted to the usual language usage for a storage battery or a storage battery unit. The battery comprises one or a plurality of battery units, with which a battery cell, a battery module, a module string or a battery pack can be denoted. In the battery, the battery cells are preferably spatially consolidated and connected to one another in terms of circuitry, for example connected in series or in parallel to modules. A plurality of modules can form so-called battery direct converters (BDC, battery direct converter) and a plurality of battery direct converters a battery direct inverter (BDI, battery direct inverter).

According to the invention, a motor vehicle is furthermore provided with such a battery system, wherein the battery thereof is connected, for example, to a drive system of the motor vehicle. The motor vehicle can be designed as a pure electric vehicle and comprise exclusively an electric drive system. Alternatively, the vehicle can be designed as a hybrid vehicle that comprises an electric drive system and an internal combustion engine. Provision can be made in several variants for the battery of the hybrid vehicle to be able to be internally charged via a generator with excessive energy of the internal combustion engine. Externally chargeable hybrid vehicles (PHEV, plug-in hybrid electric vehicle) additionally provide the option of charging the battery via the external power grid. In the case of vehicles designed in this way, the driving cycle comprises a driving operation and/or a charging operation as operating phases, in which operating parameters can be acquired.

In contrast to a battery operation according to the prior art, the method according to the invention facilitates in the short term a higher discharge power from the battery; thus enabling the warranted operating period and the warranted service life of the battery to still be maintained.

In so doing, the maximally possible discharge power is controlled while maintaining the warranted battery operating time such that the driver ideally does not notice anything. The control of the battery power that can be delivered takes place gradually, uniformly and over the entire battery operating time.

BRIEF DESCRIPTION OF THE DRAWINGS

Exemplary embodiments of the invention are depicted in the drawings and explained in detail in the following description.

In the drawings.

DETAILED DESCRIPTION

Figure 1:
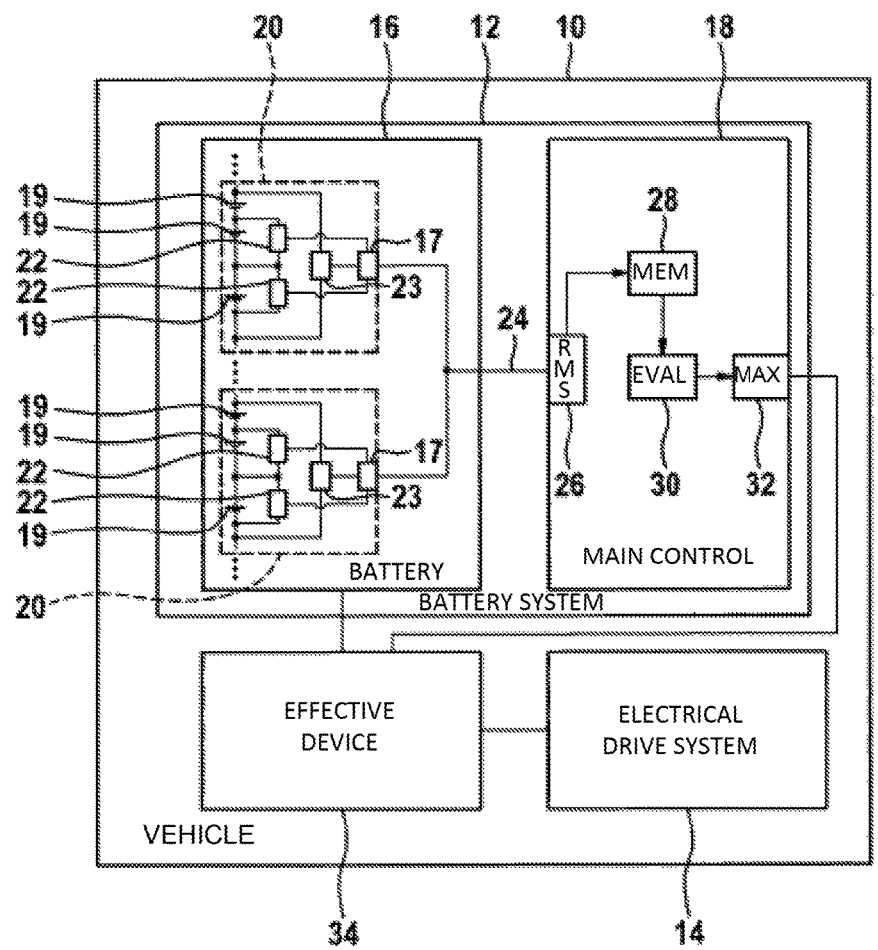
FIG. 1 shows a motor vehicle comprising a battery system.

FIG. 1 shows an at least partially electrically driven motor vehicle 10 comprising a battery system 12.

The motor vehicle 10 of FIG. 1 can be designed as a purely electrically driven vehicle or as a hybrid vehicle which additionally has an internal combustion engine. To this end, the motor vehicle 10 is equipped with an electrical drive system 14 which drives the motor vehicle 10 as least partially electrically via an electric motor (not depicted).

The electrical energy is provided by a battery 16. The battery 16 comprises a plurality of battery cells 19 or accumulator cells, for example lithium-ion cells having a voltage range of 2.8 to 4.2 V. The battery cells 19 are consolidated in groups to battery modules 20 and connected here in series and in part additionally in parallel in order to achieve the required power and energy data with the battery 16.

The battery 16 is part of a battery system 12 which furthermore comprises a battery management system. The battery management system comprises a main control device 18 and a plurality of sensor control devices 17 which are assigned to the battery modules 20.

In order to monitor individual battery cells 19 or battery modules 20, said sensor control devices are equipped with cell monitoring units 22 or module monitoring units 23, which continuously, with defined sampling rates, acquire operating parameters as measured values, said operating parameters including voltages, amperages or temperatures of individual battery cells 19 or individual battery modules 20. The acquired measured values are then provided to sensor control devices 17. The sensor control devices 17 receive the measured values of the sensors of the cell monitoring units 22 and module monitoring units 23 and provide, if need be, the measured values with time stamps and send said measured values via a communication channel 24, for example a SPI bus (serial peripheral interface bus) or a CAN bus (controller area network bus) to the main control device 18.

The main control device 18 implements functions for controlling and monitoring the battery 16. The main control device 18 comprises a unit 26 for determining a root mean square current delivered by the battery 16. The unit 26 for determining the root mean square current calculates this according to the following equation:

$$(I_{RMS})^2 = \frac{1}{t2} \int_{t_1}^{t_1+t_2} I^2(t)dt$$

The time period $t_2$ is, for example, between 10 ms and 60 s, preferably about 0.1 s long. The root is determined for each measured value, with which an $I_{RMS}$ value is formed. The $I_{RMS}$ values are stored in a memory unit 28, where said values form a frequency distribution 44, which is described in reference to FIG. 2.

The main control device 18 comprises a second unit 30 for evaluating the frequency distribution 44, which has access to the memory unit 28. The unit 30 for evaluating the frequency distribution 44 determines in which current intensity range 36, 38, 40 the $I_{RMS}$ value falls. If the $I_{RMS}$ value lies below 60 A, said value falls in the low current intensity range 36, if said $I_{RMS}$ value lies between 60 A and 100 A, it then falls in the first high current intensity range 38, and if said $I_{RMS}$ value lies between 100 A and 130 A, it then falls in the second high current intensity range 40. The current intensity ranges 36, 38, 40 are discussed in greater detail with reference to FIG. 2.

According to this completed quantization, the unit 30 for evaluating the frequency distribution 44 defines the percentages of the $I_{RMS}$ values in the first high current intensity range, i.e. $P\_i(I_{35\%})$, in the second high current intensity range 40, i.e. $P\_i(I_{3\%})$ and in the low current intensity range 36, i.e. $P\_i(I_{100\%})$, and provides this to a unit 32 for adjusting maximum value of the current that can be delivered by the battery 16.

The unit 32 for adjusting the maximum value of the current that can be delivered by the battery 16 controls the maximum value on the basis of the frequency distribution 44 of the root mean square current delivered by the battery, in particular on the basis of the $I_{RMS}$ value.

To this end, the unit for adjusting the maximum value is connected to an effective device 34, which is disposed between the battery 16 and a drive system 14. The effective device is equipped to put the maximum value into practice, for example, by non-compliance with the power specifications of the battery 16 desired by the driver of the motor vehicle 10 per gas pedal.

The unit 32 for adjusting the maximum value determines in a first step:

$$I_{RMS\_MAX} = I_{3\%RMS} + w(P\_i(I_{35\%}) - P(I_{3\%})) \cdot (I_{35\%} - I_{3\%}),$$

wherein the concrete percentage values, 3% and 35%, are to be understood by way of example and, of course, another percentage value can be defined.

$I_{RMS\_MAX}$ is then the calculated new allowed limit value of the current.

$P\_i(I_{35\%})$ is the proportion of the frequency distribution 44 in the first high current intensity range 38 from the memory unit 28, i.e. the actual value of the current distribution of the corresponding I from the historical memory, P ($I_{3\%}$) is a setpoint value for the first high current intensity range 38 from specifications, e.g. from a cell data sheet.

$I_{3\%RMS}$ is a defined value, which, e.g. comes from the cell data sheet. The setpoint value of the distribution, i.e. $P(I_{3\%})$ is a part of this value.

w is a weighting factor, namely:

$$w = 1 - \frac{t_{akt}}{t_{gw}} \text{ and } w = 0, \text{ in the event } t_{akt} > t_{gw}$$

If the actual value of the distribution is greater than the setpoint value, which is mostly the case, the calculated value $I_{RMS\_MAX}$ becomes smaller as a whole, which reduces the maximum average currents in the battery. This is the goal of the algorithm, namely a restriction that is as efficient as possible. This is later also still reversible, which represents an advantage.

If the actual value of the distribution is smaller than the setpoint value, which is very seldom the case, the calculated value $I_{RMS\_MAX}$ would become greater as a whole. This must not happen and, therefore, the unit 32 determines the maximum value in a second step according to the equation:

$$I_{RMS\_MAX} = \min(I_{RMS\_MAX}; I_{3\%RMS})$$

Figure 2:
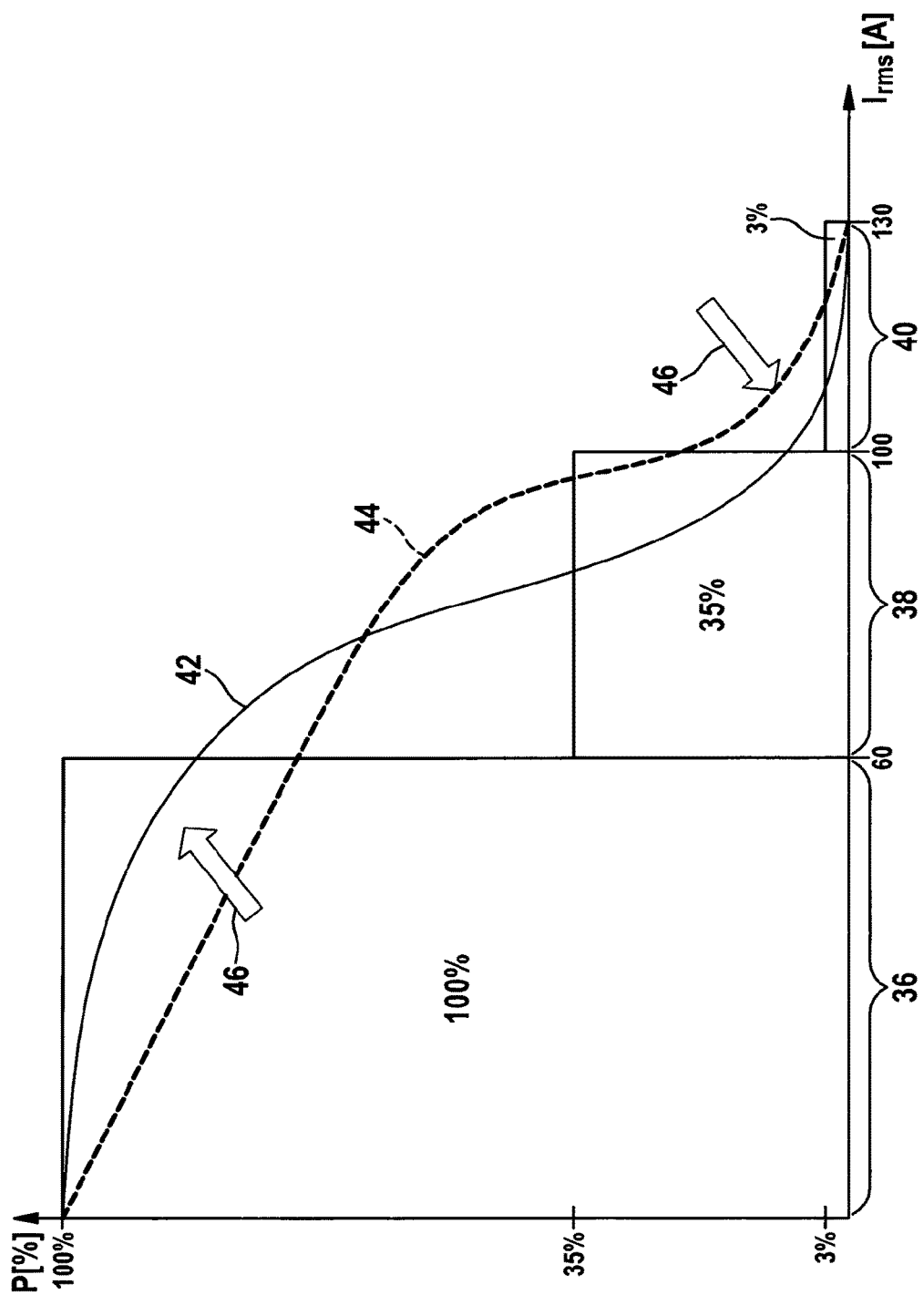
FIG. 2 shows an example for a control function.

FIG. 2 shows an example of a control, which reflects one concept underlying the invention. The $I_{RMS}$ value is depicted in the x-direction. In the y-direction, the diagram shows a scale which extends from 0 to 100%. Three ranges are depicted for the square root of the root mean square current delivered by the battery, namely the low current intensity range 36, the first high current intensity range 38 and the second high current intensity range 40. The low current intensity range 36 lies below 60 A, the first high current intensity range 38 lies between 60 A and 100 A and the second high current intensity range 40 between 100 A and 130 A.

An ideal frequency distribution 42 according to the data sheet is furthermore depicted as well as a frequency distribution 44 after the evaluation of the memory unit 28.

The two arrows 46 indicate how the frequency distribution 44 is influenced with the aid of the control function described with reference to FIG. 1 such that the proportion of the second high current intensity range 40 of the admissible total operating time is not exceeded.

In the frequency distribution 44, the control algorithm, if required, gradually takes back the admissible $I_{RMS\_MAX}$ value so that 3% operating time for the increased discharge currents from the second high current intensity range is not exceeded. In so doing, the frequency of the flowed discharge currents, i.e. $P\_i(I_{3\%})$ is influenced. The $I_{RMS\_MAX}$ value is continuously calculated. The maximum possible $I_{3\%RMS}$ value is thereby made available to the gentle drivers. Dynamic drivers obtain in a gentle manner a delimited, i.e. equilibrated $I_{3\%RMS}$ value. In the case of the dynamic drivers driving again in a gentle manner, the equilibrated $I_{3\%RMS}$ value is also again adjusted upwards for them. The warranted operating time is ideally achieved.

The invention is not limited to the exemplary embodiments described here and the aspects emphasized therein. In fact, a multiplicity of modifications, which lie within the scope of the operations of a person skilled in the art, is possible within the area specified by the claims.

The invention claimed is:

1. A method for managing a battery (16) comprising a plurality of battery cells (19), the method comprising:
   adjusting a maximum value of a current delivered by the battery (16) based on a frequency distribution (44) of a root mean square current delivered by the battery (16);
   determining data about a proportion in a low current intensity range (36), a first proportion in a first high current intensity range (38), and a second proportion in a second high current intensity range (40), from the frequency distribution (44); and
   controlling the battery (16) using a function of setpoint values for the proportions in the first and second high current intensity range (38, 40);
   wherein the first high current intensity range (38) is set lower than the second high current intensity range (40).

2. The method according to claim 1, characterized in that the control only takes place within a warranted operating time for the battery (16).

3. The method according to claim 2, characterized in that the closer a current operating time gets to an end of the warranted operating time, the control is weakened as a function of a ratio of a current operating time to the warranted operating time.

4. The method according to claim 1, characterized in that a first setpoint value for the first high current intensity range (38) lies between 10% and 50%.

5. The method according to claim 1, characterized in that the first high current intensity range (38) lies between 60 A and 100 A and the second high current intensity range (40) between 100 A and 130 A.

6. A non-transitory computer readable medium having a computer program for carrying out one of the methods according to claim 1 when the program is executed on a programmable computer device.

7. The method according to claim 1, characterized in that a second setpoint value for the high current intensity range (40) lies between 1% and 10%.

8. The method according to claim 1, characterized in that a first setpoint value for the first high current intensity range (38) lies between 10% and 50% and a second setpoint value for the high current intensity range (40) lies between 1% and 10%.

9. A battery management system of a battery (16) comprising a plurality of battery cells (19), said battery management system comprising a unit (26) for determining a root mean square current delivered by the battery (16), a unit (30) for evaluating a frequency distribution (44) of the root mean square current delivered by the battery (16) and a unit (32) for adjusting a maximum value of a current that can be delivered by the battery (16) on the basis of results of the unit (30) for evaluating the frequency distribution (44), wherein the battery management system of the battery (16) determines data about a proportion in a low current intensity range (36), a first proportion in a first high current intensity range (38), and a second proportion in a second high current intensity range (40), from the frequency distribution (44); and controls the battery (16) using a function of setpoint values for the proportions in the first and second high current intensity range (38, 40), wherein the first high current intensity range (38) is set lower than the second high current intensity range (40).

10. A vehicle (10) comprising a battery (16) which has a battery management system according to claim 9.

* * * * *